(12) United States Patent
Goldburt

(10) Patent No.: US 6,883,271 B2
(45) Date of Patent: Apr. 26, 2005

(54) DEVICE FOR ENHANCING GROWTH OF PLANTS OR VEGETABLES

(75) Inventor: E. Tim Goldburt, Chappaqua, NY (US)

(73) Assignee: General Miosphorix, Ardsley, NY (US)

( * ) Notice: Subject to any disclaimer, the term of this patent is extended or adjusted under 35 U.S.C. 154(b) by 49 days.

(21) Appl. No.: 10/659,339

(22) Filed: Sep. 11, 2003

(65) Prior Publication Data
US 2005/0055875 A1 Mar. 17, 2005

(51) Int. Cl.[7] .............. A01G 7/00; A01G 9/00
(52) U.S. Cl. ................... 47/58.1 LS; 47/17
(58) Field of Search ............ 47/58.1 R, 58.1 LS, 47/DIG. 6, 17

(56) References Cited

U.S. PATENT DOCUMENTS

| | | | | |
|---|---|---|---|---|
| 4,732,443 A | * | 3/1988 | Mori | 362/551 |
| 4,771,371 A | * | 9/1988 | Mori | 362/293 |
| 4,969,288 A | * | 11/1990 | Mori | 47/17 |
| 5,040,329 A | * | 8/1991 | Michaloski | 47/65 |
| 6,554,450 B1 | * | 4/2003 | Fang et al. | 362/231 |

FOREIGN PATENT DOCUMENTS

| JP | 402303417 A | * | 12/1990 |
|---|---|---|---|
| JP | 404179412 A | * | 6/1992 |

* cited by examiner

Primary Examiner—Son T. Nguyen
(74) Attorney, Agent, or Firm—I. Zborovsky

(57) ABSTRACT

A device for enhancing growth of plants and vegetables has a body adapted to placed on a surface accessible for sunlight, the body having photo-transforming qualities which convert UV light for plants and vegetables into growth enhancing light so as to promote photosynthesis and therefore to enhance growth of plants and vegetables, and means for delivering the growth-enhancing light to plants or vegetables.

6 Claims, 1 Drawing Sheet

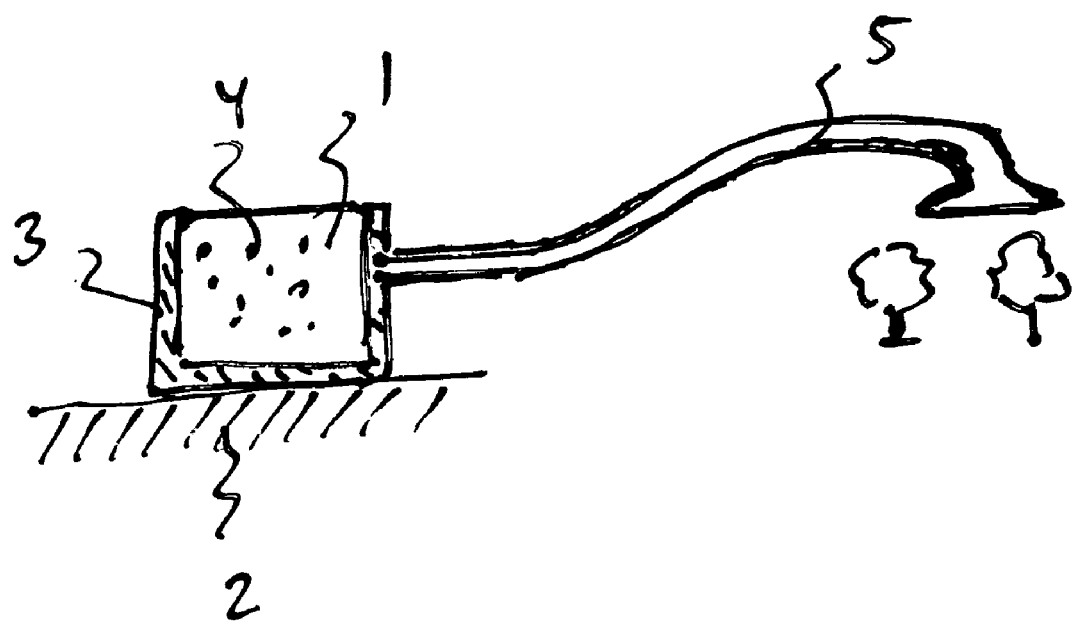

DEVICE FOR ENHANCING GROWTH OF PLANTS OR VEGETABLES

BACKGROUND OF THE INVENTION

The present invention relates to a device for enhancing growth of plants and vegetables.

Devices of the above mentioned general type are disclosed for example in our U.S. Pat. Nos. 6,158,169 and 6,434,881. The existing devices are formed as thin foils or membranes which are placed over plants and vegetables. Such devices, while efficient have some disadvantages in that they have to be of significant sizes to cover corresponding areas with plants or vegetables, they must have corresponding mechanical strength to be held in the operating position, they are also cumbersome.

SUMMARY OF THE INVENTION

Accordingly, it is an object of the present invention to provide a device of the above mentioned general type, which avoids the disadvantages of the prior art.

In keeping with these objects and with others which will become apparent hereinafter, one feature of the present invention resides, briefly stated in a device for enhancing growth of plants and vegetables, comprising a body adapted to placed on a surface accessible for sunlight, said body having photo-transforming qualities which convert UV light for plants and vegetables into growth enhancing light so as to promote photosynthesis and therefore to enhance growth of plants and vegetables; and means for delivering the growth-enhancing light to plants or vegetables.

When the device is designed in accordance with the present invention, then the body of the device can be positioned on any surface which is exposed to sunlight regardless of the location of plants or vegetables, UV light is converted by the body into a growth-enhancing light and the light is transmitted to a desired location delivery means, formed for example as through a light conduit.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view schematically showing a device for enhancing growth of plants or vegetables in accordance with the present invention.

DESCRIPTION OF THE PREFERRED EMBODIMENTS

A device for enhancing growth of plants or vegetables in accordance with the present invention has a body which is identified as a whole with reference numeral 1.

The body 1 can be formed as a free standing body having for example the shape of a parallelipid, a disk, etc. It is formed so that it can be placed on a supporting surface 2 which can be just a surface of a ground, or an additional surface, such as a plate and the like.

A non-transparent housing 3 can be provided which covers the body 1 at all sides with the exception of at least one surface which is to be exposed to sun light. The housing 3 protects the body 1 from mechanical damages and environmental influences.

The body 1 contains a photo-transforming additive for converting UV light into growth-enhancing light, to enhance photosynthesis by increasing conversion of the UV light spectrum. For this purpose the body can have for example particles 4 of photo-transforming additive which are dispersed in it. The particle size of the additive can vary from 10A to 50 $\mu$m. The particle size distribution of the photo-transforming additive can be wide or narrow.

The photo-transforming additive whose particles are dispersed in the body can be for example a luminescent material with the formula $Y_2O_2S:E_U$, as disclosed in our patent application Ser. No. 09/178,542.

The growth-enhancing light which is produced by conversion of UV light in the body in accordance with the present invention can not provide one, several, or all of the following results. It can extend the growing season, accelerate a ripening period, increase a crop yield, increase a frost protection, increase a growing temperature, reduce crop sunburns, increase essential vitamins in fruits and vegetables, reduce vulnerability to ultraviolet radiation, and therefore resulting degradation.

The device further has a light conduit which is identified with reference numeral 5. The light conduit extends from the body 1 to conduct the growth-enhancing light to a corresponding location, for example near plants or vegetables. The light conduit 5 can be formed so that it has a total internal reflection, so that the light does not come out through the peripheral surface of the conduit but instead is directly delivered to the desired point.

The conduit 5 can be formed of a plurality of optical fibers with total internal reflection. The conduit 5 can be also composed of a material which has photo-transforming qualities which convert UV light for plants and vegetables into growth-enhancing light that promotes photosynthesis, so that in the way from the body 1 to the point near plants and vegetables the conversion of the UV light takes place as well. Also, it is possible that the body 1 and the conduit 5 are composed of the same or similar materials.

When the device is designed in accordance with the present invention, the body 1 can be positioned at any location exposed to sunlight, which is convenient for a user, and the conduit 5 can be extended to a place close to plants or vegetables, for example into an interior of the greenhouse, and thereby the growth-enhancing light which promotes photosynthesis is supplied directly to the plants and vegetables. Therefore the body can be located very conveniently, it can have a small size, its shape, and dimensions are not dictated by the corresponding shapes and dimensions of plants or vegetables, it is reliably protected from the interior actions and it has a long service life.

It will be understood that each of the elements described above, or two or more together, may also find a useful application in other types of constructions differing from the types described above.

While the invention has been illustrated and described as embodied in a device for enhancing growth of plants or vegetables in accordance with the present invention, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for enhancing growth of plants and vegetables, comprising a, body adapted to placed on a surface accessible for sunlight, said body having photo-transforming qualities which convert UV light for plants and vegetables into growth enhancing light so as to promote photosynthesis and therefore to enhance growth of plants and vegetables, said body including a photo-transforming additive particles for converting UV light into growth-enhancing light, to enhance photosynthesis by increasing conversion of a UV light spectrum; and means for delivering the growth-enhancing light to plants or vegetables.

2. A device as defined in claim 1, wherein said body is formed so that the growth-enhancing light converted by said body provides at least one property selected from the group consisting of extending a growing season, accelerating a ripening period, increasing a crop yield, increasing a frost protection, increasing growing temperature, reducing crop sunburns, increasing essential vitamins in fruit and vegetables, reducing vulnerability to ultraviolet radiation and therefore a resulting degradation.

3. A device as defined in claim 1, wherein said body has a photo-transforming additive with a particle range from 50 A to 50 $\mu$m.

4. A device for enhancing growth of plants and vegetables, comprising a body adapted to placed on a surface accessible for sunlight, said body having photo-transforming qualities which convert UV light for plants and vegetables into growth enhancing light so as to promote photosynthesis and therefore to enhance growth of plants and vegetables, said body including a photo-transforming additive particles for converting UV light into growth-enhancing light, to enhance photosynthesis by increasing conversion of a UV light spectrum; means for delivering the growth-enhancing light to plants or vegetables; and non-transparent casing which partially surrounds said body to protect it from undesirable effects of mechanical damages and environmental influences.

5. A device for enhancing growth of plants and vegetables, comprising a body adapted to placed on a surface accessible for sunlight, said body having photo-transforming qualities which convert UV light for plants and vegetables into growth enhancing light so as to promote photosynthesis and therefore to enhance growth of plants and vegetables, said body including a photo-transforming additive particles for converting UV light into growth-enhancing light, to enhance photosynthesis by increasing conversion of a UV light spectrum; and means for delivering the growth-enhancing light to plants or vegetables, said means for delivering including a light conduit extending from said body to an area of a plant or a vegetable, said light conduit being composed of a material which has photo-transforming qualities which convert UV light for plants and vegetables into growth-enhancing light, said body and said conduit being composed of the same material.

6. A device as defined in claim 5, wherein said light conduit has a total internal reflection.

* * * * *